United States Patent [19]

D'Avolio et al.

[11] Patent Number: 5,479,521
[45] Date of Patent: Dec. 26, 1995

[54] PIEZOCERAMIC CAPSULE FOR TELEPHONE INSTRUMENTS

[75] Inventors: Antonio D'Avolio, Magliano dei Marsi; Luigi Pesenti, Milan, both of Italy

[73] Assignee: Alcatel Dial Face S.p.A., Milan, Italy

[21] Appl. No.: 201,367

[22] Filed: Feb. 24, 1994

[51] Int. Cl.⁶ .................................................. H04R 25/00
[52] U.S. Cl. ........................ 381/190; 381/173; 310/324
[58] Field of Search ................................... 381/190, 173, 381/114, 192; 310/324, 317, 327, 345; 379/433, 443, 440

[56] References Cited

U.S. PATENT DOCUMENTS

| 4,536,673 | 8/1985 | Forster | 310/327 |
| 4,944,017 | 7/1990 | Cognasse et al. | |
| 5,021,701 | 6/1991 | Takahashi | 310/324 |
| 5,195,142 | 3/1993 | D'Avolio et al. | |

FOREIGN PATENT DOCUMENTS

| 0336860 | 10/1989 | European Pat. Off. |
| 3425176 | 2/1986 | Germany. |
| 9100707 | 4/1991 | Germany. |

Primary Examiner—Curtis Kuntz
Assistant Examiner—Huyen D. Le
Attorney, Agent, or Firm—Ware, Fressola, Van Der Sluys & Adolphson

[57] ABSTRACT

A piezoceramic capsule for telephone instruments, of the type comprising a terminal-holder spool, a piezoceramic diaphragm in pressure contact with nail-shaped feed-through terminals forced in the spool, an elastic O-ring for producing the contact pressure and a perforated case housing them, is modified to transform the case into a cover-up disc and the spool into a case being provided with a stepped cylindric cavity designed to house, from the bottom to the top, respectively, the diaphragm, the elastic O-ring and the cover-up disc. A plurality of resilient pawls are formed by pressing inside respective cuts provided in the sidewall of the opening of said cylindric cavity and designed to snap on said cover-up disc in a closure position.

8 Claims, 4 Drawing Sheets

Positioning

Insertion 5,479,521

PIEZOCERAMIC CAPSULE FOR TELEPHONE INSTRUMENTS

TECHNICAL FIELD

The present invention relates to a piezoceramic capsule for use in telephone instruments, of the type including a bottom base in the form of a terminal-holder spool, a piezoceramic diaphragm pressed in contact with two nail-shaped terminals forced into the spool in axial direction, an elastic O-ring for generating the necessary contact pressure and a perforated case, whose openings allow the transmission of acoustic waves generated by the vibrations of the diaphragms disposed in such a way as to maintain said elastic O-ring in contact with the diaphragm.

BACKGROUND OF THE INVENTION

Such a capsule is disclosed e.g. in U.S. Pat. No. 5,195,142, which claims priority from the Italian patent applications for Utility Model No. 21175/90 and 21176/90 filed by the Applicant, which could be referred to for further details.

Therein the case made from insulating material acts as a container for the other members and it is provided on its perforated wall with an annular housing extending coaxially thereto, with a reference tooth designed to engage in a corresponding notch provided on the spool to assure the correct positioning of the latter during the assembly of the capsule, and with an annular extension designed to snap on external face of the spool and secure it.

This type of capsule as disclosed in the above-mentioned application, when positioned in the corresponding seat of the handset requires a further gasket for seal.

In an advantageous embodiment also described and illustrated in the above-mentioned U.S. patent, the case is formed directly on the bottom of the handset housing by pressing. In this circumstance the additional gasket is no longer necessary, but the automation of the capsule assembly is affected since the relative operations are tied to the type of the handset.

DISCLOSURE OF INVENTION

An object of the present invention is to provide a piezoceramic capsule of the type mentioned at the outset which is so conceived as to be free from the type of handset, to simplify the automation of the assembly operations and to avoid the use of an additional gasket when mounting the capsule into the handset.

Another object of the present invention is to provide a piezoceramic capsule of the type mentioned above which allows cost reduction.

The above-mentioned objects are obtained in accordance with the present invention by a piezoceramic capsule for telephone instruments which is characterized in that the case is substantially shaped like a cover-up disc and said spool is adapted to house, in a cylindric cavity hollowed out in its end face adjacent to said diaphragm, respectively from the bottom to the top, said diaphragm, said O-ring and said cover-up disc and to retain the same assembled with a slight preloading on the O-ring.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
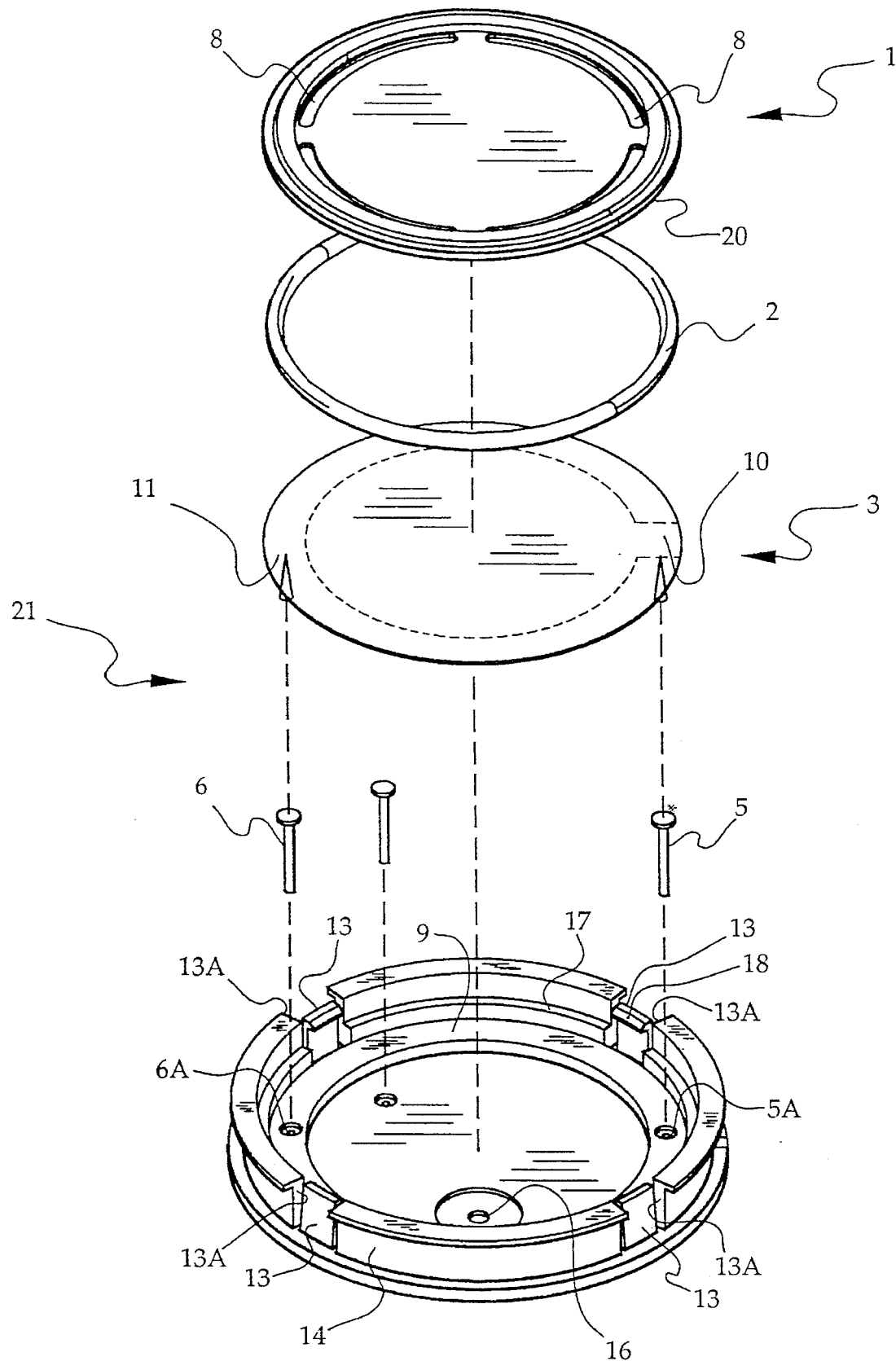
FIG. 1 is an exploded perspective view of a piezoceramic capsule according to the invention.
Figure 2:
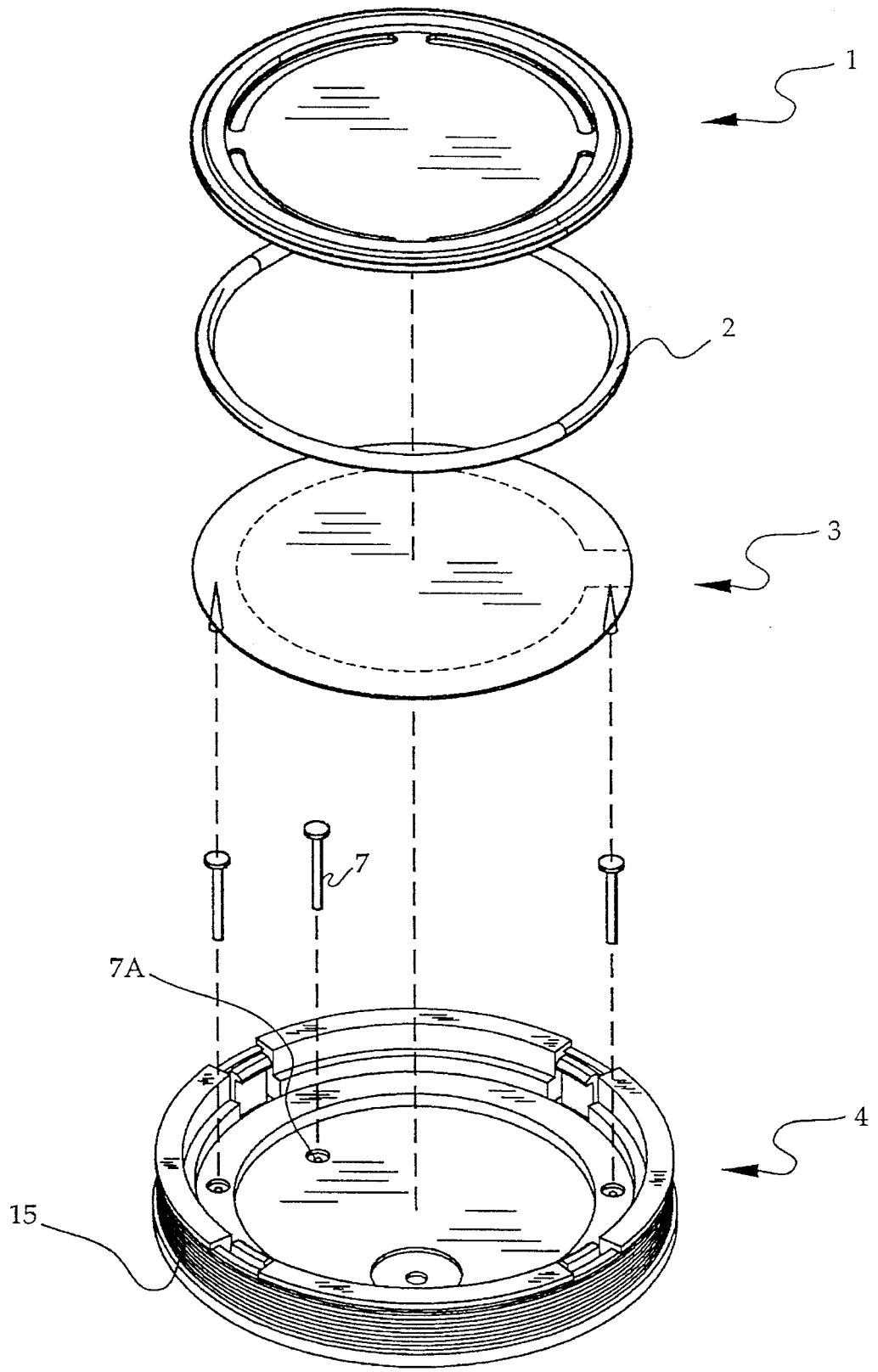
FIG. 2 illustrates the capsule of FIG. 1 mounting an additional coil to operate a prothesis for the deaf.

Referring now FIGS. 1 and 2, the capsule is denoted in its entirety by 21. It includes a bottom base 4 in the form of a circular spool made from plastic through presssing process which in the realization in accordance with the present invention, originally acts also as a casing, a piezoceramic transducing diaphragm 3 of composite type, an elastic member 2 in the form of O-ring made from elastomeric material, and finally a perforated case 1 which, originally in accordance with the invention, has the simple form of a cover-up disc.

Spool 4 has conventionally a circumferential groove designed to house a coil 15 (optional) for operating a prothesis for a deaf person, two through-holes 5A, 6A extending in an axial direction, inside which respective nail-shaped terminals 5, 6 are forced, and a third additional hole 7A for an auxiliary terminal 7 to be connected to an end of the optional coil 15 and, finally, a still axially extending through-hole 16 designed to achieve damping of microleaks of diaphragm 3.

Figure 3:
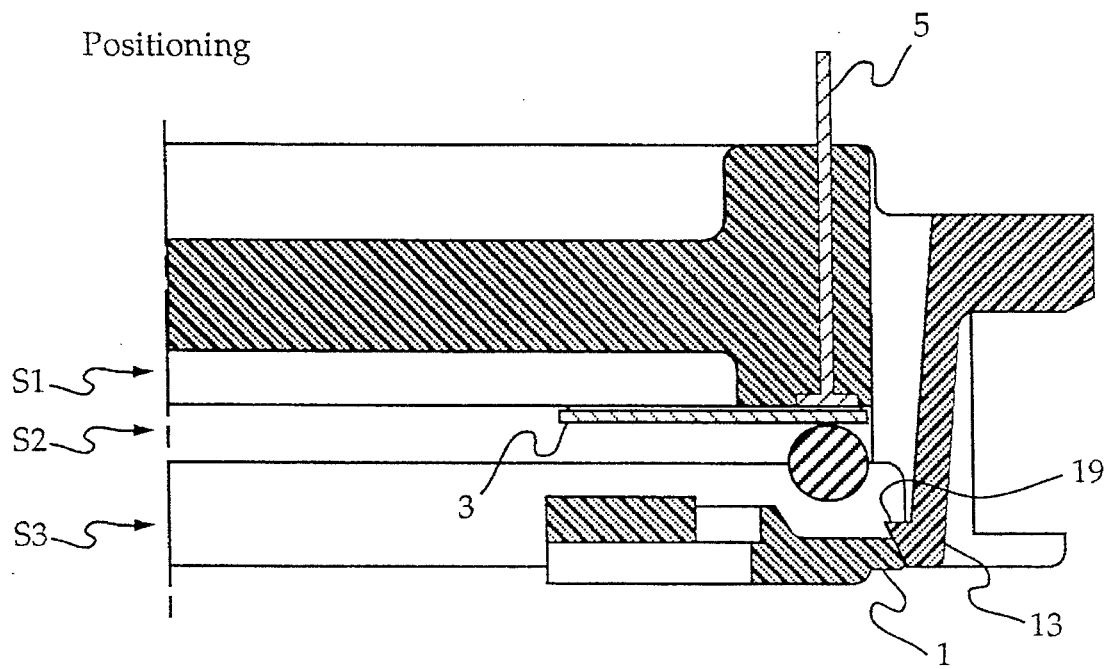
FIGS. 3 and 4 are two views, in partial cross section, that show the assembly of the capsule of FIG. 1.
Figure 4:
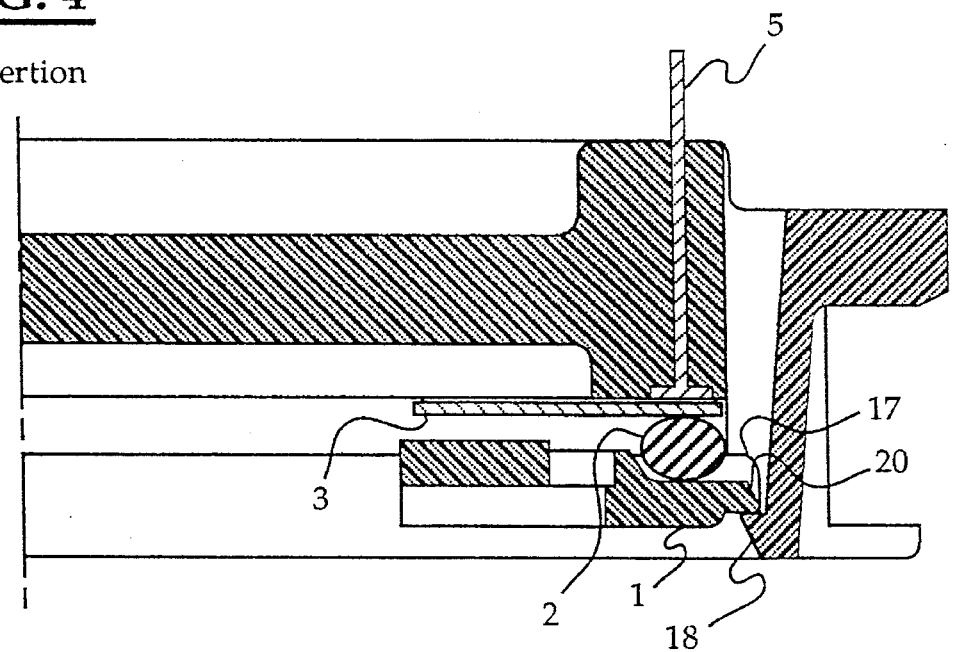

In the embodiment in accordance with the present invention, hollowed out in the end face of the spool is a cylindric cavity coaxial with the spool and designed to house, when the capsule is assembled and from the bottom to the top, the diaphragm 3, the O-ring 2 and the perforated cover 1. More specifically, the internal wall of the cavity is stepped being formed by three sections S1, S2, S3 having diameters in mounting progression, the interface between the internal section S1 having the smallest diameter and the intermediate section S2 forming a first step 9 crossed by axially extending holes 5A, 6A of peripheric terminals 5, 6 (see FIGS. 1, 3) and on which diaphragm 3 abuts with its circumferential portion comprised between the ceramic substrate 12 and the external edge, suitably oriented so its poles 10, 11 abut on the heads of the nail-shaped terminals 5, 6 respectively. A second stem 17 formed at the interface between intermediate section S2 and the external section S3, at a distance from the first step 9 approximately equal to the radius of the cross section of the O-ring plus the thickness of the diaphragm, serves as an enlargement for housing the perforated cover which has a diameter slightly greater than the diaphragm's diameter (see FIG. 4).

Machined in that portion of spool, which is comprised between the external perimeter and the opening of the cylindric cavity, are four radial cuts 13A extending in an axial direction and preferably 90 degree spaced away each other. The depth of these cuts is greater than said stepped cavity depth.

Housed inside these cuts are as many resilient pawls 13. These are blade-shaped and extend in an axial direction up to the bottom of the cuts. One of their end is rigidly fixed to the spool body while their free end is movable in a radial direction. The latter is bent towards the inside of the outer section S3 of the cylindric cavity in such a way as to form an abutment step 19 that holds the cover-up disc once assembled (see the positioning and insertion of the cover-up disc in FIGS. 3 and 4, respectively) and is disposed at such a distance from the first step 9 as to maintain a slight preloading on the elastic O-ring (see FIG. 4).

Said bent end has further a chamfer 18 converging towards the center of the cavity and whose function is to facilitate the introduction of the cover 1 into the cylindrical cavity during the assembly.

Advantageously, the resilient pawls are obtained during the forming of the spool by pressing.

In the realization in accordance with the invention, the perforated cover 1 is formed by pressing as a simple cover-up disc suitably shaped. It has four openings 8 in the form of sector of an annulus to allow the transmission of the acoustic waves produced by the vibrations of diaphragm 3, disposed along a circumference near the external edge and it is provided with a chamfer 20 converging towards the inside of the capsule (see FIGS. 1, 4) substantially parallel to chamfer 18 on the top of resilient pawls 13.

The capsule according to the invention can be easily assembled in an automatized manner.

Once positioned the spool, feed-through terminals are forced into respective holes, the auxiliary coil (if required) is wound up, the diaphragm already oriented is automatically introduced by the assembling machine, the elastic ring is then introduced and finally the cover. Sliding of the chamfer of the cover on the corresponding chamfer of the elastic pawls (see FIG. 3) causes the broadening of the latters and the subsequent snap action through the abutment step of the resilient pawls (see FIG. 4).

Figure 5:
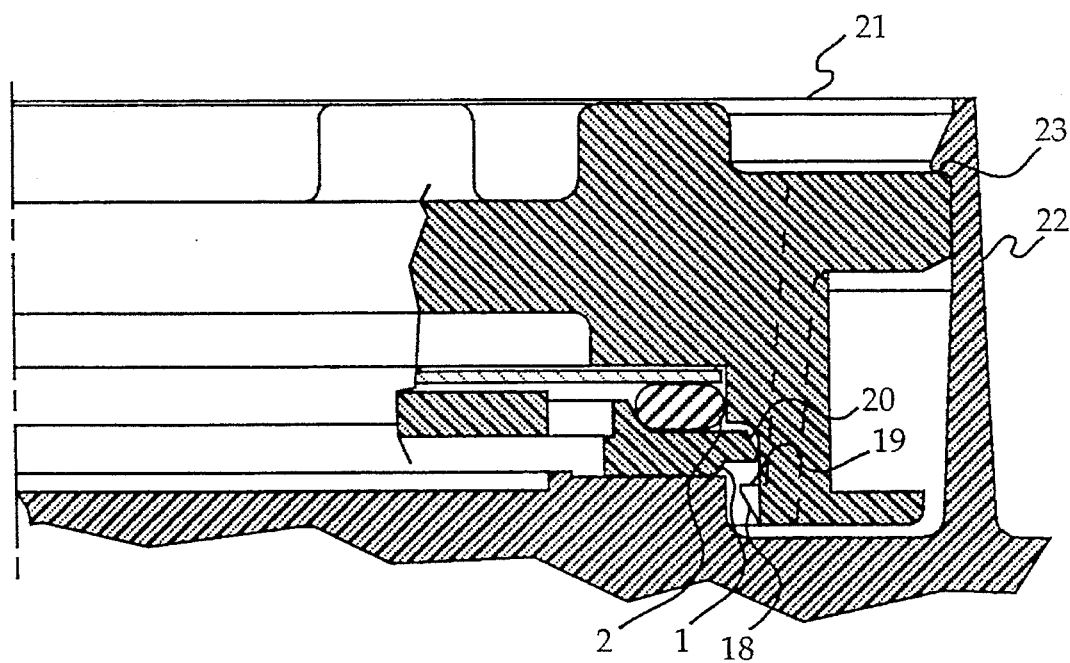
FIG. 5 is a cutaway which illustrates the mounting of the capsule assembly of FIG. 1 inside the seat provided in the housing of a telephone instrument.

The capsule is thus assembled and can be mounted in the corresponding seat provided, e.g., on the housing 22 of the handset where it is hold in situ by a suitable detent 23 which is so positioned as to maintain compressed the elastic O-ring in order to assure the sealing (see FIG. 5). It is to be pointed out that because of the flattening of the O-ring 2, which besides sealing assures also the contact pressure on the diaphragm, the cover-up disc 1 is no longer in contact with the abutment step 19 of the pawls on the spool.

From the foregoing it is evident that the present invention full achieves all the objects mentioned at the outset; in fact the automation of the assembling operations is simplified since the capsule is not tied to the type of the handset housing, it does not require an additional gasket when mounted on the subset and it is cheaper thanks to the simplification of the cover and of the automatic assembly operations.

Moreover, it can be mounted on the handsets already in use which have the case directly formed in the housing of the handset, as disclosed in the U.S. Pat. No. 5,195,142 mentioned at the outset.

Naturally, materials, dimensions and construction details can be changed according to the circumstances and requirements of manufacturing and use without departing from the characteristics illustrated, described and claimed below.

Similarly, although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Piezoceramic capsule for telephone instruments, comprising:

a base in the form of a circular spool made of insulating material, provided with at least two nail-shaped feed-through terminals, forced into respective through-holes axially extending in said base, said terminals being accessible from outside said base;

a piezoceramic diaphragm in the form of a disc having a central portion of a first face covered by a circular ceramic layer and having two poles located on said first face to be in pressure contact with heads of said two nail-shaped terminals respectively;

an elastic element in a form of an O-ring disposed on a second face of said diaphragm for providing a selected contact pressure between said poles and said terminal heads; and a case provided with at least one opening for the transmission of acoustic waves generated by vibrations of said diaphragm, disposed in such a way as to hold said elastic element in contact with said diaphragm;

said case being substantially formed as a cover-up disc;

said circular spool has a cylindrical cavity hollowed out therein to house from inside to outside in an assembly order comprising, respectively, said diaphragm, said O-ring and said cover-up disc and to hold said diaphragm, said O-ring and said cover-up disc assembled with a selected pre-loading on the O-ring; and a portion of said circular spool between an outer perimeter thereof and an inner wall of an intermediate section of said cylindrical cavity being broken by a plurality of radial cuts axially extending beyond an innermost cavity section, a plurality of resilient pawls are arranged inside each of said plurality of radial cuts, each of said resilient pawls being movable in a radial direction for snapping on an outer surface of said cover-up disc and for holding said diaphragm, said O-ring and said cover-up disc assembled with said selected pre-loading on said O-ring.

2. Piezoceramic capsule according to claim 1, wherein said cylindrical cavity is stepped and formed by three sections with an increasing diameter from said inside to outside, said sections forming two steps, a first one at an interface between an innermost section with a smallest diameter and said intermediate section, for receiving in abutment said piezoceramic diaphragm and a second step at an interface between said intermediate section and an outermost section being located approximately at a midpoint of a cross section of said O-ring.

3. Piezoceramic capsule according to claim 2, wherein said innermost section of said stepped cavity has a diameter between a diameter of said diaphragm and a diameter of said circular ceramic layer.

4. Piezoceramic capsule according to claim 1, wherein said cover-up disc has an outer edge provided with a chamfer converging towards the inside of the capsule.

5. Piezoceramic capsule according to claim 1 wherein each of said resilient pawls has a lamellar shape, axially extending towards a base of a respective cut, with a first end rigidly fixed to said spool and a second end bent and converging towards an inside of said outer cavity section so as to form an abutment step for said snapping on said cover-up disc for holding it with said selected pre-loading on said O-ring.

6. Piezoceramic capsule according to claim 5, wherein said bent end of said pawls has a chamfer converging toward the inside of said outer cavity.

7. Piezoceramic capsule according to claim 5, wherein said resilient pawls are housed in said radial cuts during forming of the spool by pressing.

8. Piezoceramic capsule according to claim 7, wherein said resilient pawls are spaced ninety degrees from each other.

* * * * *